United States Patent
Okamoto et al.

(10) Patent No.: US 12,326,713 B2
(45) Date of Patent: Jun. 10, 2025

(54) SERVO CONTROL DEVICE

(71) Applicant: FANUC CORPORATION, Yamanashi (JP)

(72) Inventors: Takashi Okamoto, Yamanashi (JP); Yuuki Morita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 97 days.

(21) Appl. No.: 18/259,733

(22) PCT Filed: Mar. 22, 2022

(86) PCT No.: PCT/JP2022/013296
§ 371 (c)(1),
(2) Date: Jun. 28, 2023

(87) PCT Pub. No.: WO2022/202850
PCT Pub. Date: Sep. 29, 2022

(65) Prior Publication Data
US 2024/0061400 A1   Feb. 22, 2024

(30) Foreign Application Priority Data
Mar. 26, 2021 (JP) ................. 2021-052693

(51) Int. Cl.
*G05B 19/414* (2006.01)
(52) U.S. Cl.
CPC .. *G05B 19/414* (2013.01); *G05B 2219/41074* (2013.01); *G05B 2219/41177* (2013.01)
(58) Field of Classification Search
CPC ........ G05B 19/414; G05B 2219/41074; G05B 2219/41177; G05B 2219/49053; H02P 23/20; B23Q 15/0075; Y02P 70/10
(Continued)

(56) References Cited

U.S. PATENT DOCUMENTS 8,054,028 B2 * 11/2011 Aoyama ............. G05B 19/414
700/169

FOREIGN PATENT DOCUMENTS

JP   H11-089291 A   3/1999
JP   5781241 B1    9/2015
(Continued)

OTHER PUBLICATIONS

International Search Report issued in PCT/JP2022/013296; mailed Apr. 26, 2022.

*Primary Examiner* — David Luo
(74) *Attorney, Agent, or Firm* — Studebaker Brackett PLLC

(57) ABSTRACT

The purpose of the present invention concerns a control command for a machine tool, and is to make it possible to adopt a high-frequency repetitive oscillation command, without restrictions on communication capacity, when acquiring a control command created by superimposing a command with repeatability on a normal move command such as a move command having no repeatability. The purpose can be achieved by: acquiring, from an higher-order control device, only information about the form of a command, and parameter information on numerical information relating to an amplitude, a period, and other feature amount; creating a repetitive movement command that is a command with repeatability only from the parameter information; and superimposing the repetitive movement command on a normal move command such as a move command having no repeatability.

5 Claims, 10 Drawing Sheets

(58) Field of Classification Search
USPC .......................................... 318/569, 567, 560
See application file for complete search history.

(56) References Cited

FOREIGN PATENT DOCUMENTS

| | | |
|---|---|---|
| JP | 2018-180633 A | 11/2018 |
| JP | 2018-181210 A | 11/2018 |
| JP | 2019-185355 A | 10/2019 |
| JP | 2020-009248 A | 1/2020 |
| WO | 2005/120759 A1 | 12/2005 |
| WO | 2015/177912 A1 | 11/2015 |

* cited by examiner

REPETITIVE OSCILLATION COMMAND (EXAMPLE OF NORMAL MOVEMENT COMMAND 1:
COMMAND HAVING NON-REPEATABILITY)

(EXAMPLE OF NORMAL MOVEMENT COMMAND 2: LOW-FREQUENCY REPETITIVE OSCILLATION COMMAND)

(EXAMPLE OF NORMAL MOVEMENT COMMAND 3: COMMAND HAVING NON-REPEATABILITY + LOW-FREQUENCY REPETITIVE OSCILLATION COMMAND)

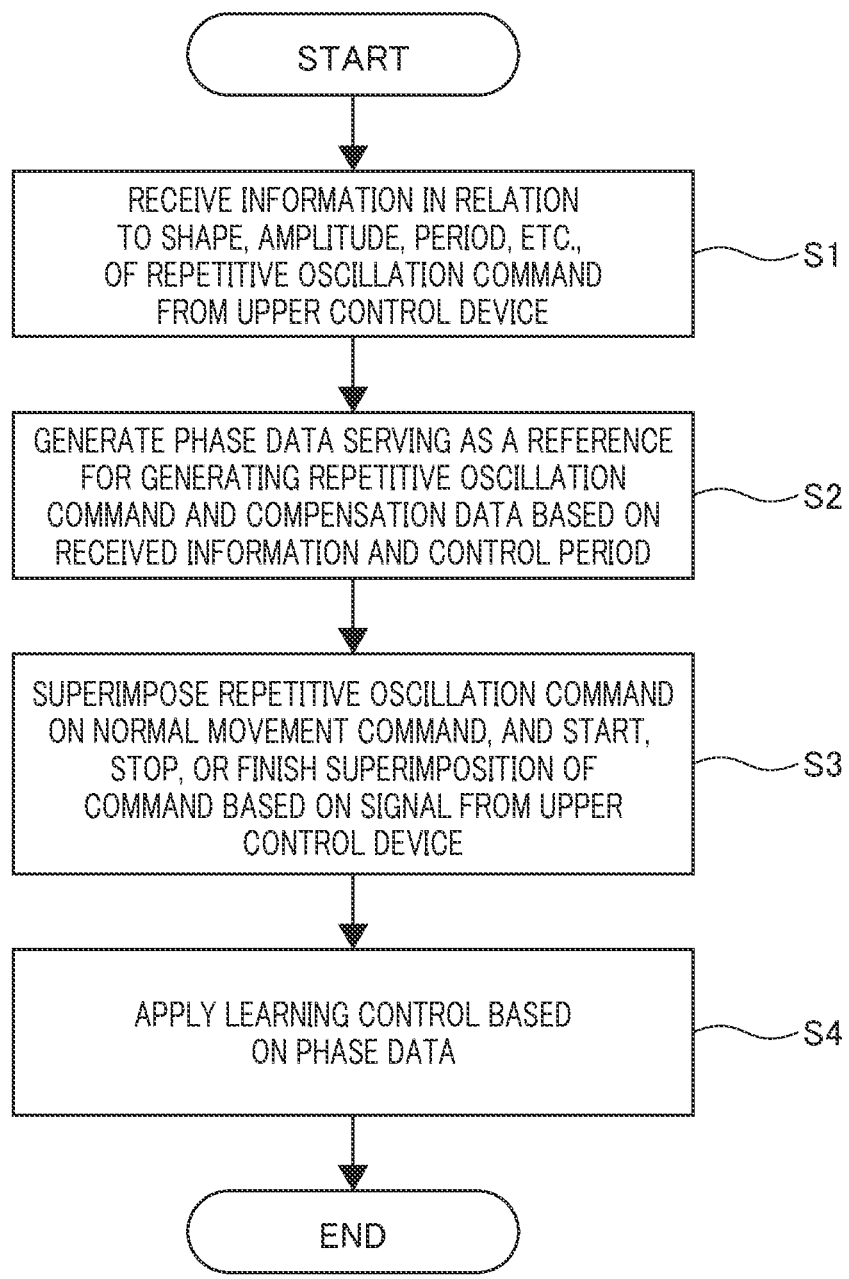

SERVO CONTROL DEVICE

TECHNICAL FIELD

The present invention relates to a servo control device, and more particularly to a servo control device that performs motor control in accordance with a command including a repetitive oscillation command.

BACKGROUND ART

Conventionally, in the control of a drive device such as a motor, a command prepared by superimposing a command in relation to repetitive movement such as a reciprocal vibration command (swing command) on a command having non-repeatability has been used as the control command.

Patent Document 1 describes a technique of controlling a machine tool that performs a threading process by performing a turning process on a workpiece, in which a swing movement is incorporated in a machining movement of a tool in order to thin chips generated by the turning process, and a control technique of the machine tool that adds (superimposes) a repetitive oscillation command relating to a swing movement with a swing amplitude and in a swing direction appropriate for cutting the chips to a movement command for relatively moving the workpiece and the tool for the turning process.

Patent Document 2 relates to a control device for a machine tool that performs swing cutting, and describes a control device for a machine tool that performs machining of a workpiece while relatively swinging a tool and a workpiece by cooperative movement of a spindle and a feed axis in order to finely cut chips generated by machining for the purpose of reducing a load on the machine tool due to swing cutting. This indicates that the command in relation to swinging a workpiece and a tool relatively is superimposed. Further, in the technology of Patent Document 2, when the machining condition indicates the machining by the interpolation movement of one of a plurality of feed axes, the tool and the workpiece are relatively swung in the direction along the machining path, and when the machining condition indicates machining by the simultaneous interpolation movement of the plurality of feed axes, the swing direction is changed or the swing is stopped with respect to the machining path.

Patent Document 1: Japanese Unexamined Patent Application, Publication No. 2019-185355
Patent Document 2: Japanese Unexamined Patent Application, Publication No. 2020-9248

DISCLOSURE OF THE INVENTION

Problems to be Solved by the Invention

As described above, a technique is known in which a control command in a control device of a machine tool includes a repetitive oscillation command such as a reciprocal vibration command (swing command) in a superimposed manner in addition to a command having non-repeatability.

However, in Patent Document 1, when generating a swing command (repetitive oscillation command) in a control device (servo control device), it is necessary to input a machining program from the outside to calculate a swing condition, and then generate a swing command, which requires input of information having a large amount of data from the outside, resulting in a problem that the communication capacity becomes too large. Moreover, it is necessary to calculate the swing condition from the inputted machining program, and it takes time to generate the control command based on the calculation amount, and thus, it is difficult to realize high followability of the control operation.

Furthermore, in Patent Document 2, since a swing command (repetitive oscillation command) is generated by an upper control unit, and the generated swing command is transmitted to a control unit (servo control unit), in a case of a high-frequency swing command having a very high frequency, a problem arises in that the communication capacity between the upper control unit and the servo control unit becomes too large and difficulty arises in transmission.

It is an object of the present invention to provide a servo control device capable of employing a high-frequency repetitive oscillation command without being limited in communication capacity, and realizing high followability when obtaining a control command obtained by superimposing the repetitive oscillation command on a normal movement command as a control command in a control device of a machine tool.

Means for Solving the Problems

In order to solve the abovementioned problem, a servo control device for performing control of a servo motor is provided which includes: a repetitive oscillation command generator that obtains, from a upper control device, only parameter information relating to information of a type of a shape of a command waveform, and numerical information relating to an amplitude and a period of the command waveform and other feature amounts relating to the shape and dimension of the command waveform to generate and output a repetitive oscillation command; and a command superimposer that obtains a movement command from the upper control device and superimposes the repetitive oscillation command outputted by the repetitive oscillation command generator on a command having non-repeatability.

Effects of the Invention

According to the servo control device of the present disclosure, since it is possible to transmit information of a small amount of data from the upper control device in order to perform the servo control, i.e., a repetitive oscillation command is generated in the servo control device without being limited by the communication capacity between the upper control device and the servo control device, it is possible to employ a high-frequency command with a very high frequency as the repetitive oscillation command. Furthermore, in the servo control device, since parameter information such as a type of a given waveform and numerical value data is directly given and a repetitive oscillation command is generated only from the given parameter information, the amount of calculation for generating a repetitive oscillation command is curbed, and thus it is possible to realize control operation with high followability.

BRIEF DESCRIPTION OF THE DRAWINGS

FIG. 14 is a flowchart showing an embodiment of the present disclosure.

PREFERRED MODE FOR CARRYING OUT THE INVENTION

Hereinafter, embodiments of the present invention will be described in detail with reference to the accompanying drawings.

Figure 1:
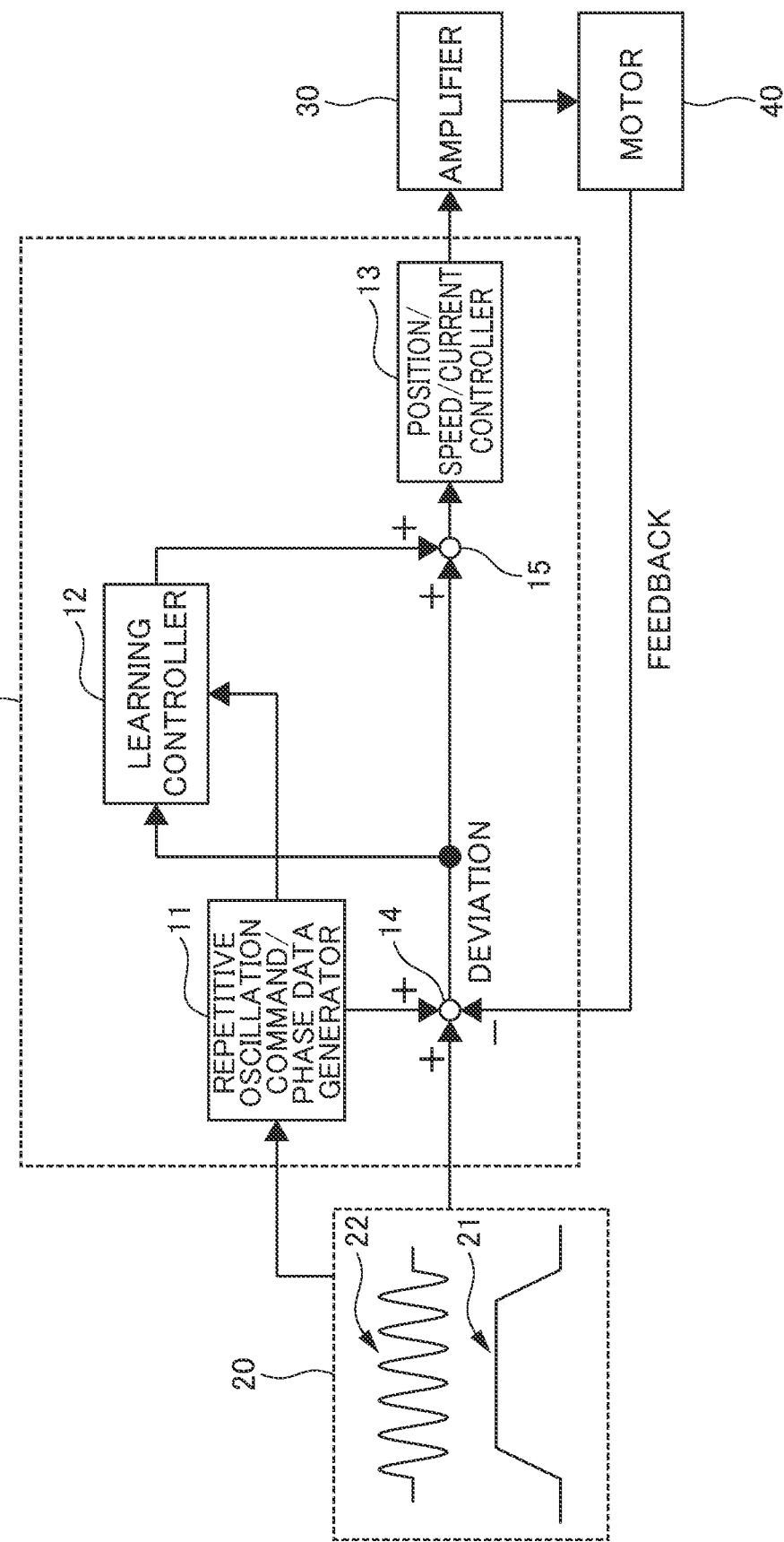
FIG. 1 is a control block diagram of a servo control device according to an embodiment of the present disclosure.

FIG. 1 is a control block diagram of a servo control device according to an embodiment of the present disclosure. As shown in FIG. 1, in the servo control device according to the embodiment of the present disclosure, data in relation to a movement command and a repetitive command (repetitive oscillation command) is notified from an upper control device 20 to a servo control device 10, the repetitive oscillation command and phase data are generated in the servo control device 10, the repetitive oscillation command is superimposed on the movement command, learning control based on the phase data is applied, and position, speed, and electric current control are applied, and then the data is sent to the amplifier 30, whereby the motor 40 is driven and controlled by the output.

The servo control device 10 includes a repetitive oscillation command/phase data generator 11, a learning controller 12, a position/speed/current controller 13, a first adder 14, and a second adder 15.

A signal of a normal movement command such as a command having non-repeatability is sent from the upper control device 20 to the first adder 14 of the servo control device 10, and data relating to the signal of the repetitive oscillation command is sent to the repetitive oscillation command/phase data generator 11. The normal movement command includes, for example, a command for basic design for determining the shape of a workpiece. The repetitive oscillation command/phase data generator 11 generates a repetitive oscillation command and sends it to the first adder, generates phase data for each servo period or cycle, and sends it to the learning controller 12. The above-mentioned "data relating to a signal of a repetitive oscillation command", "generation of phase data", and "generation of a repetitive oscillation command" will be described in detail later. On the other hand, in the first adder 14, the repetitive oscillation command generated by the repetitive oscillation command/phase data generator 11 is added (superimposed) to the movement command sent from the upper control device 20 to form a superimposed command, and the deviation between the superimposed command and the signal fed back from the motor 40 is obtained and sent to each of the learning controller 12 and the second adder 15.

In the learning controller 12, learning control is performed on the deviation between the superposed command obtained by the first adder 14 and the feedback signal, based on the phase data generated by the repetitive oscillation command/phase data generator 11. In learning control based on phase data, a compensation amount is obtained by an integrated deviation up to one period before, and an inputted command (deviation) is compensated to improve followability to a periodic command, and the technology itself is well known in the related art, and thus a detailed description thereof is omitted here. By applying the learning control, it is possible to perform operation with high followability and high-precision.

The second adder 15 adds the deviation between the command obtained by superimposing the movement command from the upper control device 20 calculated by the first adder 14 and the repetitive oscillation command from the repetitive oscillation command/phase data generator 11, and the signal fed back from the motor 40, and an output signal from the learning controller 12, whereby the output is sent to the position/speed/current controller 13. The position/speed/current controller 13 calculates an appropriate drive voltage of the motor 40 from the inputted position command, speed command, and current command, and drives the motor 40 by the output extended and adjusted by the amplifier 30.

The upper control device 20 outputs, to the servo control device 10, data related to a normal movement command 21 such as a command having non-repeatability and a repetitive oscillation command 22. In the present disclosure, as the "data relating to the repetitive oscillation command 22", only the parameter information in relation to data of the type of the command waveform, numerical value data of the amplitude and the period, and numerical value data representing the other feature amounts of the shape and the dimension of the command waveform is outputted from the upper control device 20 to the servo control device 10. Examples of the shape of the command waveform include a sine wave, a triangular wave, and a rectangular wave. When a repetitive oscillation command is generated by an upper control device as in the conventional example and the command (wave) itself is sent to a servo control device, if the repetitive oscillation command is high frequency having a very high frequency, the communication capacity becomes too large, and transmission (communication) becomes difficult. In the present disclosure, since only the parameter information is transmitted, the communication capacity between the upper control device 20 and the servo control device 10 is small, and it is possible to generate and use a high-frequency repetitive oscillation command without being limited by the communication capacity.

Next, with reference to FIG. 2, a normal movement command and a repetitive oscillation command will be described. On the left side of FIG. 2, an movement (raster movement) is depicted in which a normal movement command in a direction perpendicular to the direction of the reciprocating movement by the repetitive oscillation command is superimposed on the repetitive oscillation command, and the reciprocating movement is moved by a constant amount in the vertical direction for each period to fill up a certain area.

Figure 2:
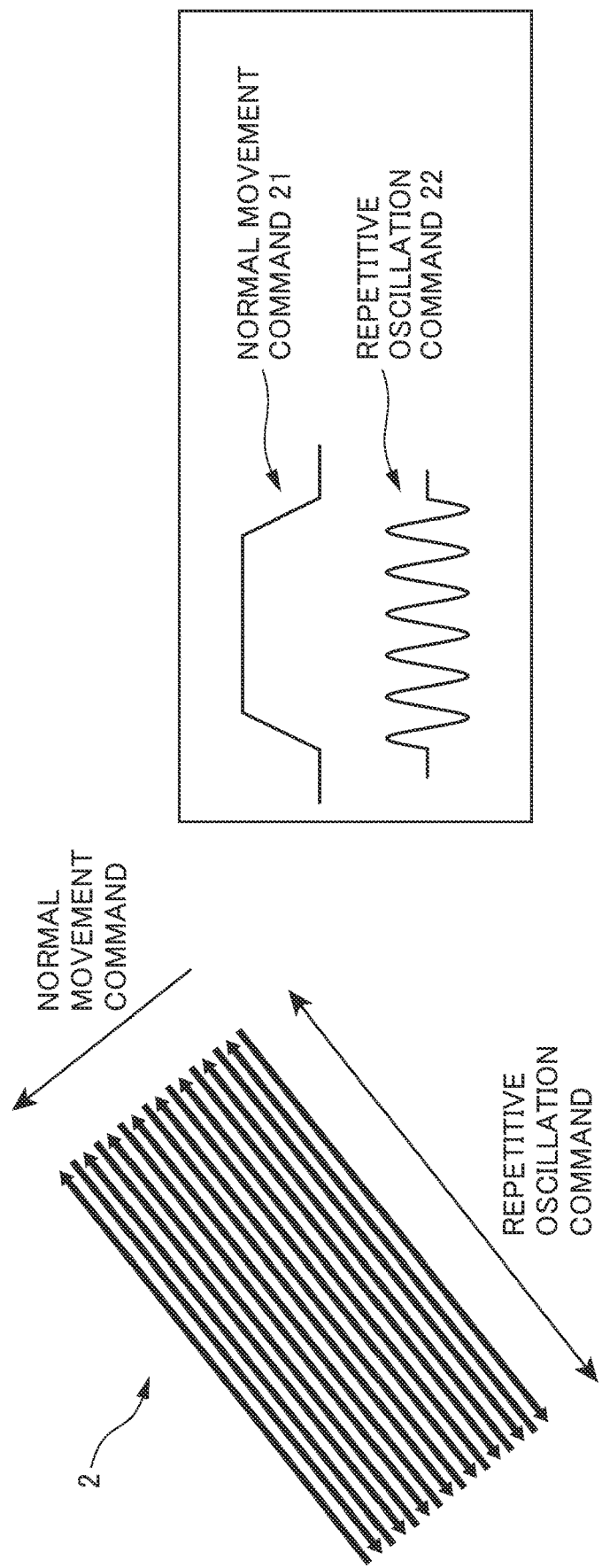
FIG. 2 is a diagram illustrating a normal movement command and a repetitive oscillation command according to the present disclosure.
Figure 3:
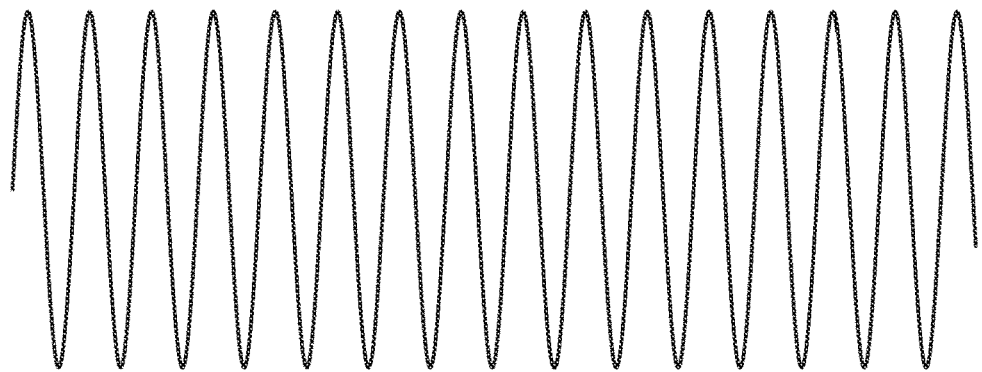
FIG. 3 is a diagram showing a repetitive oscillation command (high-frequency repetitive oscillation command)
Figure 4:
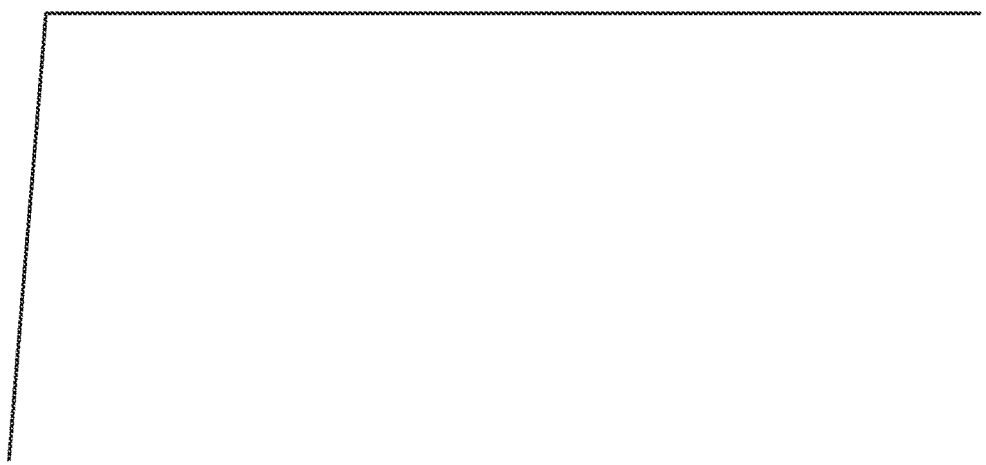
FIG. 4 is a diagram showing a trapezoid command, which is an example of a command having non-repeatability.
Figure 5:
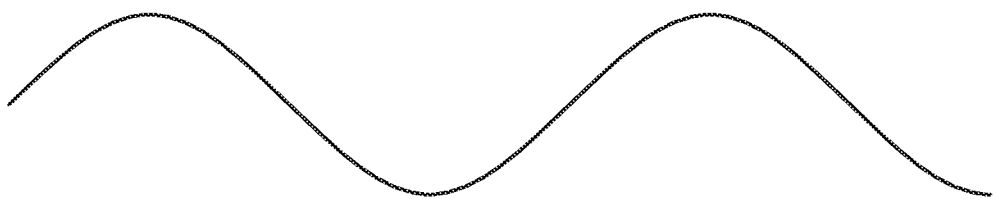
FIG. 5 is a diagram showing a command including a linear acceleration/deceleration part and a constant speed part, which is an example of a command having non-repeatability.
Figure 6:
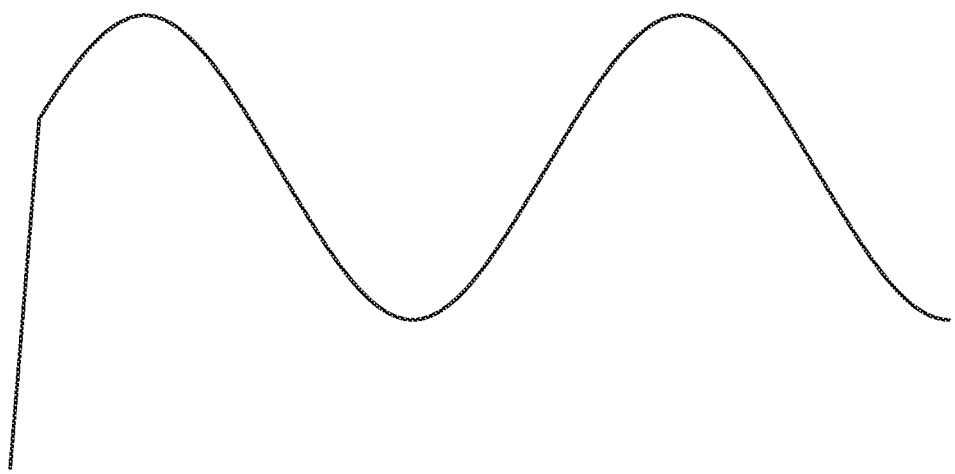
FIG. 6 is a diagram showing a low-frequency repetitive oscillation command.

The repetitive oscillation command is a command for repeating a reciprocating movement, and examples thereof include a command of a waveform (a sine wave or the like) shown as a representative diagram on the right side of FIG. 2. Furthermore, FIG. 3 shows an example of a waveform of a high-frequency signal. The normal movement command corresponds to either a non-repetitive command, a low-frequency repetitive command, or a combination thereof. Examples of the non-repetitive command include a trapezoid command shown as a representative diagram on the right side of FIG. 2, and a command including a linear acceleration/deceleration part and a constant speed part shown as a representative diagram in FIG. 4. The low-frequency repetitive oscillation command is, for example, a command of a waveform (low-frequency sine wave or the like) shown as a representative diagram in FIG. 5, and has a lower frequency than the repetitive oscillation command represented by the waveform on the right side in FIG. 2. The command obtained by adding the non-repetitive command and the low-frequency repetitive command has, for example, the waveform shown as a representative diagram in FIG. 6 (a waveform obtained by combining the waveforms in FIGS. 4 and 5).

Figure 7:
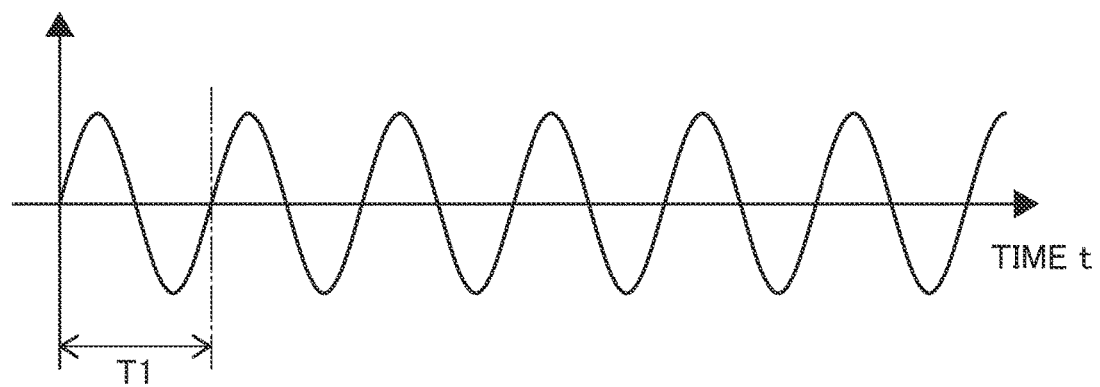
FIG. 7 is a diagram showing a period T1 in a repetitive oscillation command.

Next, with respect to "generation of phase data", a method of generating phase data from a repetitive oscillation command will be described with reference to FIGS. 7 to 10. FIG. 7 shows a period T1 in a repetitive oscillation command. The vertical axis represents the command position (distance), and the horizontal axis represents the elapsed time t. In the repetitive oscillation command shown in FIG. 7, the command position returns to the original command position every time the time T1 elapses due to the repetition (reciprocation) of the command and, therefore, it can be recognized that the period thereof is T1.

Figure 8:
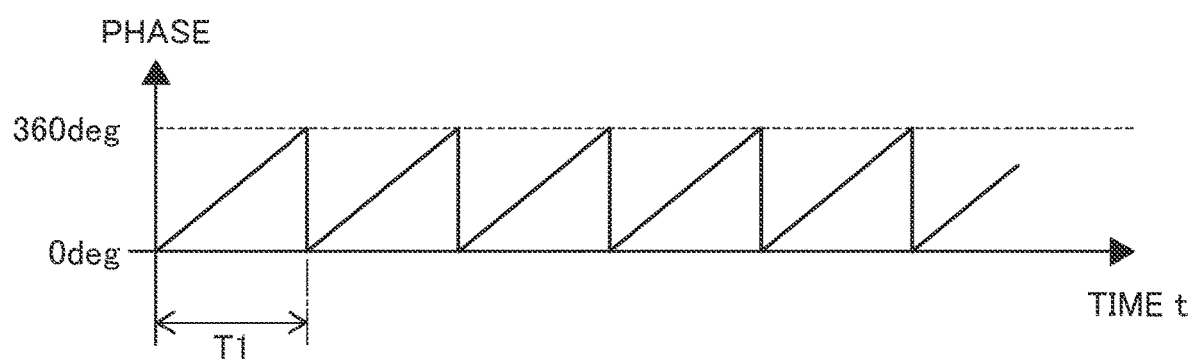
FIG. 8 is a diagram showing phase data corresponding to a repetitive oscillation command.

FIG. 8 shows phase data corresponding to the repetitive oscillation command of FIG. 7. The vertical axis represents phase, and the horizontal axis represents elapsed time t. In the phase of the repetitive oscillation command, the constant phase progresses every time a constant time elapses, and the phase returns to the original phase (0°) every time the phase progresses 360° (degrees) after the elapse of the period T1. That is, in the period of the period T1, the phase is proportional to the time t. This state is shown in FIG. 8.

Figure 9:
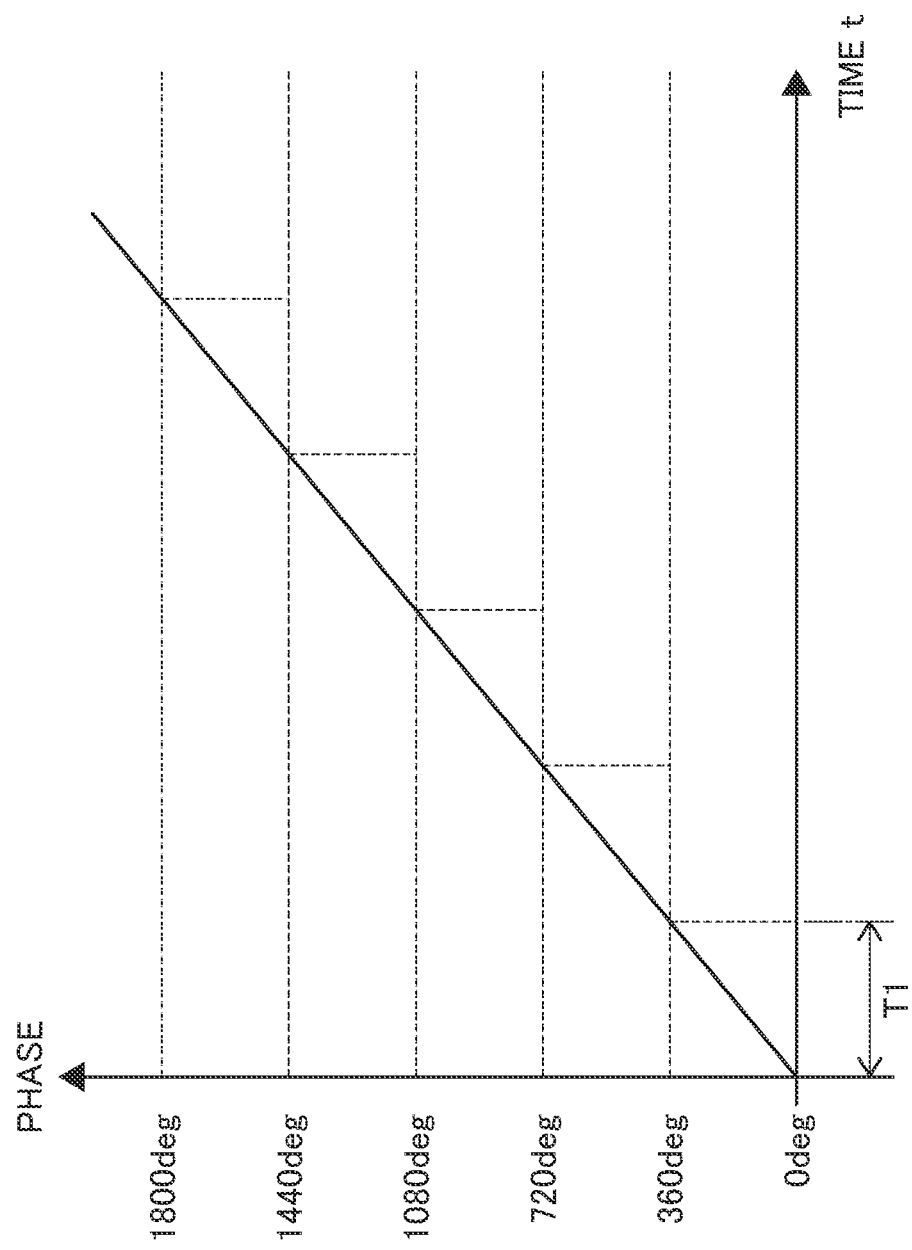
FIG. 9 is a diagram equivalent to phase data corresponding to a repetitive oscillation command.

In FIG. 8, the phase returns to the (0°) phase every time the phase progresses by 360° after the elapse of the period T1, but the phase may be further added from 360°. After a time period of the period T1 has elapsed and the phase has progressed by 360°, the phase is added from 360° when the time period has elapsed. In this case, the phase is not limited to within the period of the period T1, but is proportional to the time t in all the periods. This state is shown in FIG. 9. The vertical axis represents phase, and the horizontal axis represents elapsed time t.

In the example of FIG. 9, assuming that the period of a repetitive oscillation command is T1 and the elapsed time is t, the phase θ is represented by the following equation (1) as a mathematical function θ(t) of the time t.

[Formula 1]

$$\theta(t) = 360 \times (t/T1) \quad \text{Equation (1)}$$

Here, assuming that the servo control period in the servo control device 10 is Ts, since the time Ts elapses every one period of the servo control period, the phase θ(t) when one period of the servo control period elapses is obtained by substituting t=Ts, as follows.

[Formula 2]

$$\theta(Ts) = 360 \times (Ts/T1) \quad \text{Equation (2)}$$

When n periods (n=1, 2, 3 ...) of the servo control period have elapsed, the phase θ is given as a function θ(n) of the number n of periods as follows.

[Formula 3]

$$\theta(n) = 360 \times (n \cdot Ts/T1) \quad \text{Equation (3)}$$

Figure 10:
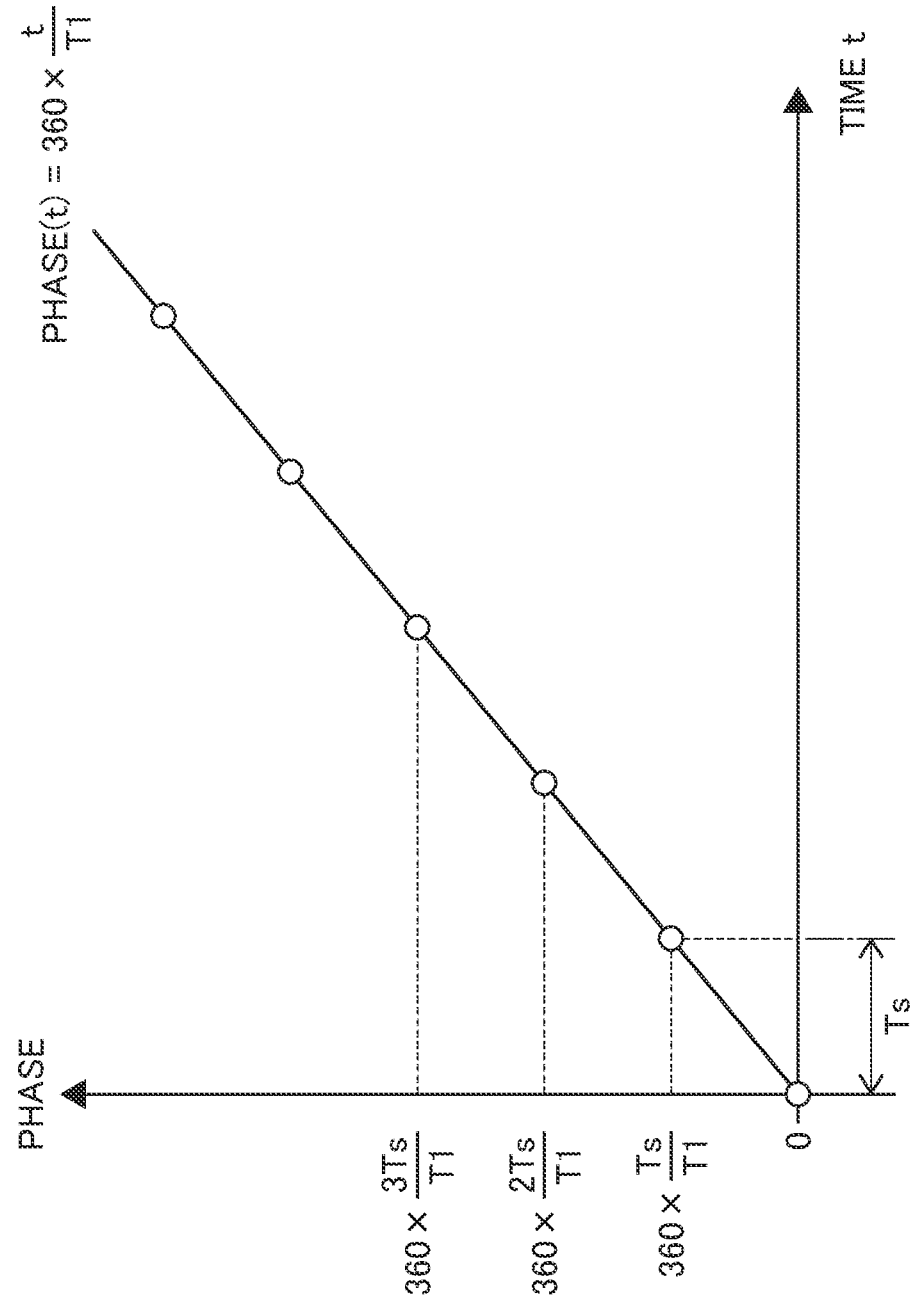
FIG. 10 is a diagram showing phase data for each servo control period.

This state is shown in FIG. 10. The vertical axis represents phase, and the horizontal axis represents elapsed time t.

Figure 11:
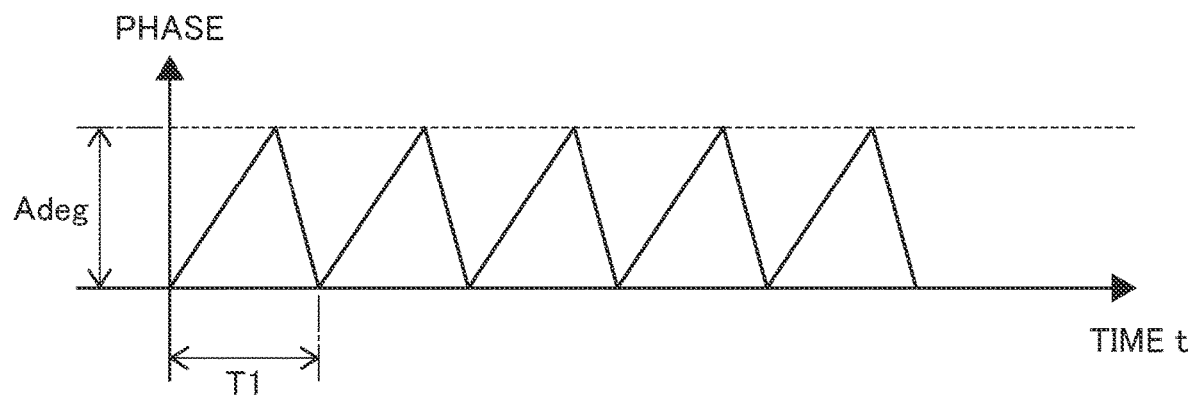
FIG. 11 is a diagram showing a repetitive oscillation command in an embodiment.
Figure 12:
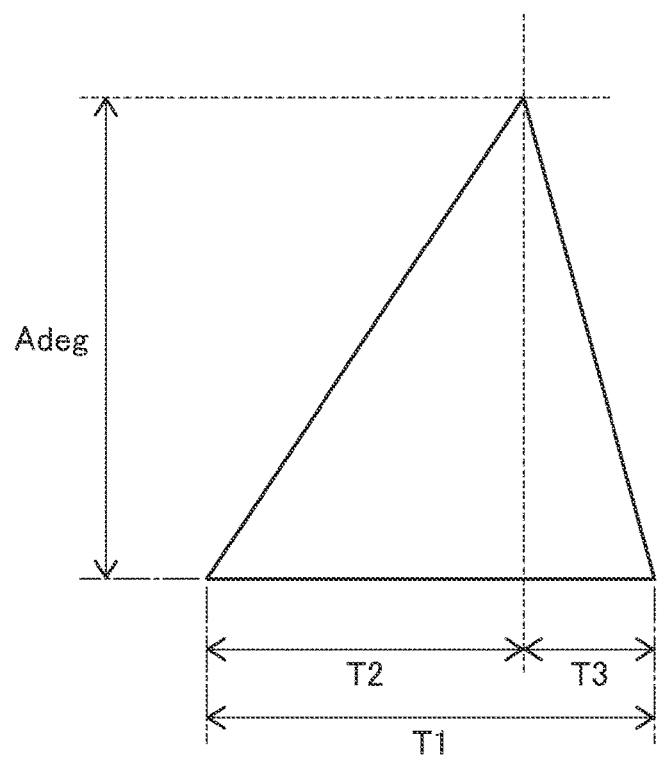
FIG. 12 is a diagram showing a feature amount of a repetitive oscillation command in an embodiment.
Figure 13:
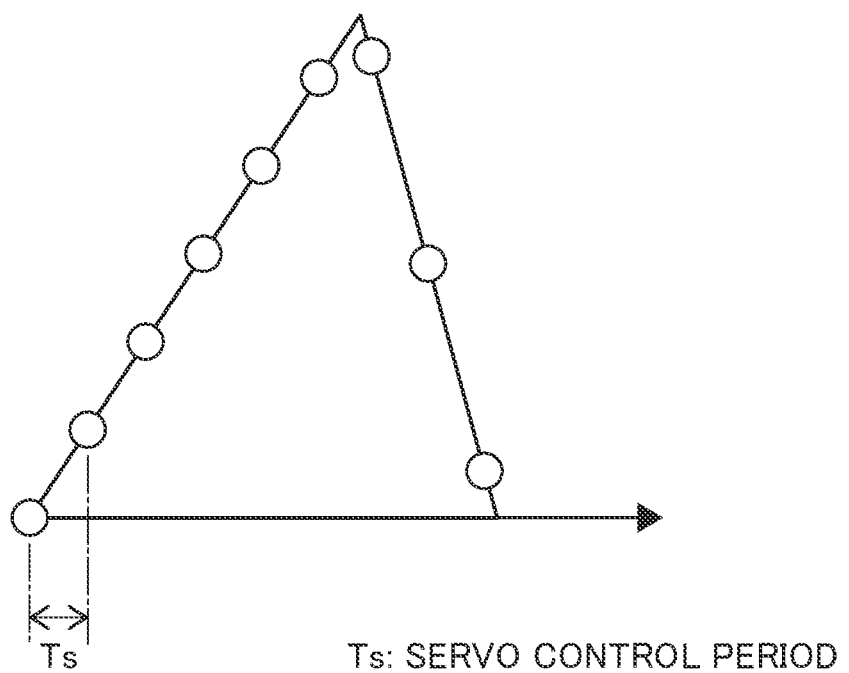
FIG. 13 is a diagram showing a method of generating a repetitive oscillation command from reception information and a control period.

Next, with respect to "generation of a repetitive oscillation command", a method of generating a repetitive oscillation command from data relating to a repetitive oscillation command will be described with reference to FIGS. 11 to 13. FIG. 11 shows that the waveform of the command is sawtooth as a repetitive oscillation command. The upper control device 20 extracts only the parameter information in relation to shape data (sawtooth wave), numerical value data (A(deg)), numerical value data (T1) of the period of the waveform of the command, and numerical value data (T2, T3) of the other feature amounts from the repetitive oscillation command of the sawtooth wave shown in FIG. 11, and sends the extracted parameter information to the servo control device 10. In order to realize a high-frequency repetitive oscillation command, it is desirable to suppress the amount of communication between the upper control device 20 and the servo control device 10 as much as possible.

Next, the numerical value data (T2, T3) of the feature amounts extracted from the repetitive oscillation command of FIG. 11 will be described with reference to FIG. 12. In the repetitive oscillation command of FIG. 11, the upward inclination and the downward inclination of the sawtooth wave are different from each other, and these are respectively represented by the upward time (T2) and the downward time (T3) of the sawtooth wave, and the upstream time (T2) and the downstream time (T3) of the sawtooth wave are feature amounts in the repetitive oscillation command of FIG. 11. It is needless to say that what numerical value data is required as the feature amount varies depending on the type of a waveform of the command.

A method of generating a repetitive oscillation command from the parameter information received by the servo control device 10 and the servo control period Ts will be described with reference to FIG. 13. When the servo control device 10 receives the parameter information in relation to shape data (sawtooth wave) of the waveform, numerical value data (A(deg)) of the amplitude, numerical value data (T1) of the period, and numerical value data (T2, T3) of the feature amount of the repetitive oscillation command, the displacement (position) in the wave of the command for each servo period Ts is obtained from these pieces of information and the servo control period Ts. FIG. 13 shows the displacement (position) of the command in the wave at each servo period Ts, and a repetitive oscillation command is generated by a set of these points. That is, the servo control device 10 grasps a repetitive oscillation command as a set of points indicating the relationship between the servo period Ts and displacement (position) of the command in the wave.

One embodiment of the servo control of the present disclosure will now be described with reference to the flowchart of FIG. 14. First, the servo control device receives information such as the shape, amplitude, and period of a repetitive oscillation command from the upper control device (Step S1). By receiving only the parameter information in relation to the shape of the command (sawtooth wave), the numerical value data of the amplitude, the numerical value data of the period, and the numerical value data of the other feature amounts as the information of the shape, the amplitude, the period, and the like of the repetitive oscillation command, it is possible to suppress the communication capacity, and it is thereby possible to generate and adopt the high-frequency repetitive oscillation command.

Next, based on the control period and the information received by the servo control device, phase data serving as a reference for the repetitive oscillation command and the compensation data generation is generated (Step S2). As described above, the repetitive oscillation command is generated as a set of points of displacement (position) in the wave of the repetitive oscillation command for each servo period Ts. As described above, the phase data is obtained by phase $\theta(n)=360\times(n\cdot Ts/T1)$ when the period of the received frequency is T1, the servo control periods is Ts, and the number of servo control periods elapsed is n (n=1, 2, 3 . . . ).

Next, the repetitive oscillation command is superimposed on the normal movement command. On the basis of a signal from the upper control device, the superposition of the command is started or stopped or finished (Step S3). Here, as described above, the deviation between the superimposed command obtained by superimposing the repetitive oscillation command on the normal movement command and the signal fed back from the motor is obtained, and the motor is driven and controlled based on the signal with the obtained deviation.

Finally, learning control is applied based on the phase data generated in Step S3 (Step S4), and this flow ends. By applying the learning control, it is possible to enhance the followability corresponding to the superimposed command in which the high-frequency repetitive command is superimposed on the movement command, and to perform more accurate control.

In the servo control device according to the invention of the present disclosure, it is possible to suppress the communication capacity between the upper control device and the servo control device by the configuration in which only the parameter information including the information relating to the shape of the command and the numerical information relating to the amplitude, the period, and the feature amounts thereof is obtained from the upper control device. As a result, it is possible to generate and adopt a high-frequency command having a very high frequency in the servo control device. That is, a significant advantageous effect is achieved in that it is possible to adopt a high-frequency command having a very high frequency as a repetitive oscillation command in the servo control device without being limited by the communication capacity.

Furthermore, in the servo control device, parameter information such as a given waveform shape type and numerical value data is directly given, and a repetitive oscillation command is generated only based on the given parameter information, such that it is possible to suppress the amount of calculation for generating a repetitive oscillation command, and it is possible to realize high followability of the control operation.

Furthermore, by applying the learning control, it is possible to realize higher followability and higher accuracy control operation.

Embodiments of the present invention have been described above; however, the present invention is not limited to these embodiments, and it is needless to say that the present invention can be implemented in various forms without departing from the gist of the present invention.

EXPLANATION OF REFERENCE NUMERALS

10 servo control device
11 repetitive oscillation command/phase data generator
12 learning controller
13 position/speed/current controller
14 first adder
15 second adder
20 upper control device
21 normal movement command
22 repetitive swing command
30 amplifier
40 motor

The invention claimed is:

1. A servo control device for performing control of a servo motor, the servo control device comprising:
   a repetitive oscillation command generator that obtains, from an upper control device, only parameter information relating to information of a type of a shape of a command waveform, and numerical information relating to an amplitude and a period of the command waveform and other feature amounts relating to the shape and dimension of the command waveform to generate and output a repetitive oscillation command; and
   a command superimposer that obtains a movement command from the upper control device and superimposes the repetitive oscillation command outputted by the repetitive oscillation command generator on the movement command.

2. The servo control device according to claim 1, wherein the movement command is any one among the command having non-repeatability, a low-frequency repetitive oscillation command, or a command of a combination of the command having non-repeatability and the low-frequency repetitive oscillation command.

3. The servo control device according to claim 1, wherein the repetitive oscillation command generator further includes a phase data generator that generates phase data for each servo control period based on data of the period or frequency of the repetitive oscillation command obtained from the upper control device and the servo control period of the servo control device.

4. The servo control device according to claim 3, further comprising a learning controller that performs learning control based on the phase data generated by the phase data generator.

5. The servo control device according to claim 1, wherein the command superimposer starts, stops, or finishes superimposition of the repetitive oscillation command based on a signal from the upper control device.

* * * * *